United States Patent [19]
Hynes et al.

[11] Patent Number: 5,330,946
[45] Date of Patent: Jul. 19, 1994

[54] PROCESS OF ACID BINDING FINE SMECTITE CLAY PARTICLES INTO GRANULES

[75] Inventors: Russell E. Hynes, Aberdeen, Miss.; Robert S. Nebergall, Lombard, Ill.

[73] Assignee: American Colloid Company, Arlington Heights, Ill.

[21] Appl. No.: 11,273

[22] Filed: Jan. 29, 1993

[51] Int. Cl.[5] .................. B01J 20/12; B01J 21/16; B01J 37/00
[52] U.S. Cl. .............................. 502/82; 502/81
[58] Field of Search ............................ 502/81, 82, 83

[56] References Cited

U.S. PATENT DOCUMENTS

| | | | |
|---|---|---|---|
| 1,544,210 | 6/1925 | Bierce | 502/81 |
| 2,892,800 | 6/1959 | Taipale | 502/82 |
| 2,981,697 | 4/1961 | Mickelson et al. | 502/82 |
| 4,717,699 | 1/1988 | Mickelson | 502/81 |

*Primary Examiner*—Carl F. Dees
*Attorney, Agent, or Firm*—Marshall, O'Toole, Gerstein, Murray & Borun

[57] ABSTRACT

A bentonite clay-based polymerization catalyst is manufactured by adhering together a plurality of smaller acid-activated bentonite clay particles, using a strong mineral acid, such as $H_2SO_4$, as a binder. An acid-activated bentonite clay having a particle size below about 60 mesh, U.S. Sieve Series, preferably calcium bentonite, having calcium as a predominant exchangeable action, is mixed with a strong mineral acid, preferably $H_2SO_4$, and water to form the catalyst. The mixture is subjected to intensive mixing, curing and drying to form strong particles capable of grinding to a desired particle size distribution, e.g., $-6$ mesh to $+60$ mesh, U.S. Sieve Series, to form the catalyst. Fines resulting from the grinding step are completely recycled to the intensive mixing stage of the process to achieve 100% yield. Some adjustment of acid content of the mix may be needed to take into account the acid carried into the mix by recycled fines.

28 Claims, 1 Drawing Sheet

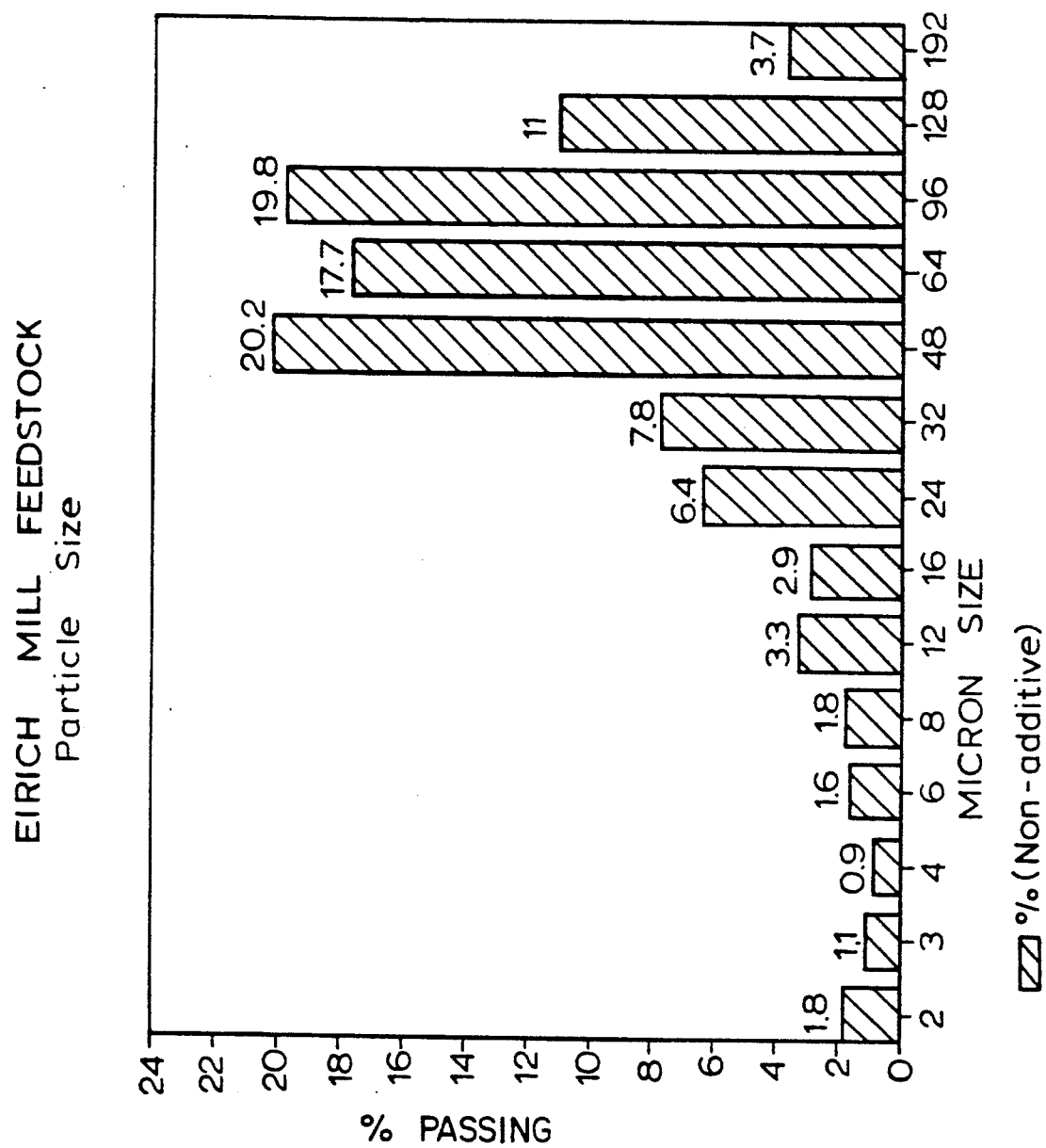

PROCESS OF ACID BINDING FINE SMECTITE CLAY PARTICLES INTO GRANULES

FIELD OF THE INVENTION

The present invention is directed to a method of manufacturing acid-activated clay granules, from finer clay particles, by binding the fine clay particles together with an acid. The resulting clay granules are suitable as a polymerization catalyst, for decolorizing oils and to promote other hydrocarbon reactions. More particularly, the present invention is directed to a method of manufacturing an olefin polymerization catalyst by acid binding together small (fine) particles of an acid-activated smectite clay, optionally containing a portion of non-acid-activated smectite clay.

BACKGROUND OF THE INVENTION

Aromatic hydrocarbons, particularly benzene, toluene and xylene (BTX), are a by-product formed in the production of gasoline in an oil refinery. The separation of BTX from other hydrocarbons, for example, using a catalytic reformer and an extraction device, results in a BTX mixture containing contaminants, particularly reactive contaminants, such as olefins and diolefins. These contaminants must be removed from the aromatics to obtain the aromatic hydrocarbons in a useful form, particularly for nitration-grade aromatics.

One of the specifications of nitration-grade aromatics is called an Acid Wash Color Test. This involves washing the sample with concentrated sulfuric acid and comparing the resultant color produced with a set of standards. The darker the color, the greater the concentration of impurities, particularly diolefins. This test was introduced in the days when benzene was made from coal tar, by treating it with sulfuric acid. A low Acid Wash Color indicated that the manufacturer had used a sufficiently large quantity of sulfuric acid to remove all the unwanted, highly reactive contaminants.

Olefins are objectionable in aromatic hydrocarbon, e.g., BTX, products for the following reasons: they are reactive and produce undesirable co-products in downstream processing, such as colored materials, such as benzene sulfonates; olefins in xylenes in the production of various xylene derivations, e.g., trimethylxylene occupy sieve capacity thereby adversely affecting performance; and olefins can cause fouling in high temperature equipment, such as a xylene column reboiler.

Another test for detecting the presence of olefins in hydrocarbons, e.g., aromatic hydrocarbon mixtures, is Bromine Index or Bromine Number. Specifically, the Bromine Index is a measure of the milligrams of bromine consumed by 100 grams of sample under given conditions, and Bromine Number is a measure of the grams of bromine consumed by 100 grams of sample. A comparison of the different bromine tests is shown in Table I.

TABLE I

| BROMINE INDEX/BROMINE NUMBER METHODS | | | | |
|---|---|---|---|---|
| | ASTM D 1159 | ASTM D 1491 | ASTM D 1492 | ASTM D 2710 |
| Analysis Title: | Number Bromine Number of petroleum distillates and commercial aliphatic olefins by electrometric titration | Index Bromine Index of Aromatic hydrocarbons by potentiometric titration | Index Bromine Index of Aromatic hydrocarbons by coulometric titration | Index Bromine Index of Aromatic hydrocarbons by electrometric titration |
| Definition: | grams Br per 100 grams sample | milligrams Br per 100 grams per sample | milligrams Br per 100 grams sample | milligrams Br per 100 grams sample |
| Catalyst (HG): | None | Acetate | Chloride None | |
| Reaction Temp. °C.: | 0–5 | Ambient | Ambient | 0–5 |
| Titrant (Bromide/ Bromate): | 0.5N | 0.02N | Glacial Acetic Methanol KBr, HgAc | 0.05N |
| Titration Solvent | (CCl$_4$/ C$_2$H$_3$Cl$_3$) | CCl$_4$ | | C$_2$H$_3$Cl$_3$ |

For example, olefinic compounds are present in hydrogenated, steam-cracked naphtha. The olefin concentration is higher at the end of the hydrogenation processing, whereas at the start of hydrogenation, the Bromine Index of a hydrogenated, steam-cracked naphtha is typically in the range of 100 to 200 (milligrams bromine per 100 grams of sample).

Olefins will always be present in the catalytic reformate, product of a catalytic reformer that is operated under severe conditions (i.e., low pressure). Although the concentration of diolefinic compounds in catalytic reformate are so low as to be hardly traceable by modern laboratory techniques, they are sufficient in quantity to render the Acid Wash Color Test of the aromatic products off-specification. The Bromine Index of catalytic reformate is typically 1000 to 2000 (milligrams bromine per 100 grams of sample), having a Bromine Number of one or two.

The great majority of olefins entering as an extractor feed, together with other reformate products and selective extraction solvents, e.g., triethylene glycol, tetraethylene glycol (TEG) and SULFOLANE (tetrahydrothiophene), are removed from the extractor with raffinate and sent to storage. The raffinate from catalytic reformate feed is typically in the range of 5000 to 8000 milligrams bromine per 100 grams of sample, or a Bromine Number of five to eight. Olefins, and in particular diolefins, are somewhat polar and are, therefore, partly extracted along with the aromatics and leave with the extract product. The quantity of olefins in the hydrocarbon extract is very small in comparison to the olefin content in the raffinate or extractor charge. The Bromine Index of a hydrocarbon extract product from catalytic reformate feed is typically in the range of 50 to 100 milligrams bromine per 100 grams of sample. This would be sufficient to render the Acid Wash Color Test of the product aromatics off-specification. It is, therefore, necessary to treat the extract product derived from extracting raffinate for removal of these olefinic compounds. A comparison of the bromine indices of extractor feed to bromine index of extract and aromatic product is shown in Table II wherein the extract product and aromatic products were derived from catalytic reformates and hydrogenated steam-cracked naphthas.

TABLE II

BROMINE INDEX VALUES OF TYPICAL SULFOLANE UNIT STREAMS (LABORATORY FRACTIONATIONS UNTREATED EXTRACTS)

| REFINER | EXTRACTOR FEED | EXTRACT | BENZENE PRODUCT | TOLUENE PRODUCT | XYLENE PRODUCT | HEAVY AROMATICS |
|---|---|---|---|---|---|---|
| Catalytic Reformate Feed (UOP Platforming) | | | | | | |
| U.S. Gulf Coast | | 79 | 7 | 32 | 85 | 145 |
| U.S. Gulf Coast | | 121 | 46 | 112 | 135 | 320 |
| U.S. Gulf Coast | 1700 | 60 | 20 | 50 | 70 | |
| U.S. Gulf Coast | 1300 | 90 | | 20 | 60 | |
| Hydrogenated Steam-Cracked Naphtha Feed | | | | | | |
| Japan | 150 | 20 | 12 | 24 | 17 | |
| Japan | 200 | 30 | 16 | 46 | 17 | |
| Japan | 450 | | 10 | 30 | 100 | |
| Japan | 700 | | 10 | 50 | 100 | |
| Japan | 100 | 6 | 6 | 11 | 7 | 90 |

It has been found that there are only two practical methods for improving the Acid Wash Color of the aromatic products resulting from solvent extraction of a reformate product (from catalytic reformation of light hydrocarbons, e.g., $C_1$–$C_4$): hydrotreating the extractor feed; and bentonite clay catalyzing the extract stream to polymerize the olefins for separation of olefins from the aromatic hydrocarbons. Hydrotreating the catalytic reformate saturates the olefins and diolefins. However, hydrotreating is too expensive to be employed in actual practice since it requires a catalyst, a high pressure reactor vessel and other associated equipment. In addition, a source of hydrogen makeup is required which may or may not always be available.

A more attractive and less expensive method is the percolation of the extract product from reformate over an acid-activated clay. The clay partly absorbs the olefinic materials and partly acts as an acidic catalyst to polymerize the mono-olefins into higher boiling polymeric, e.g., dimeric, compounds, which are eliminated in subsequent fractionation steps.

The present invention is directed to a method of manufacturing a bentonite clay-based catalyst, in granule form, by acid binding smaller (fine) clay particles such that the bound clay particles, in the form of acid-bound granules, have sufficient breaking strength and structural integrity to perform as a olefin polymerization catalyst, with substantially increased yield ($\approx 100\%$) due to the capability of recycling all fine clay particles produced in grinding.

BRIEF DESCRIPTION OF THE DRAWING

The drawing is a bar graph showing a particle size distribution for acid-activated clay particles fed to the intensive mixer.

SUMMARY OF THE INVENTION

In accordance with the present invention, a bentonite clay-based polymerization catalyst is manufactured by adhering together a plurality of smaller acid-activated bentonite clay particles, using a strong mineral acid, such as $H_2SO_4$, as a binder. An acid-activated bentonite clay having a particle size below about 60 mesh, U.S. Sieve Series, preferably calcium bentonite, having calcium as a predominant exchangeable cation, is mixed with a strong mineral acid, preferably $H_2SO_4$, and water to form the catalyst. The mixture is subjected to intensive mixing, curing and drying to form strong particles capable of grinding to a desired particle size distribution, e.g., −6 mesh to +60 mesh, U.S. Sieve Series, to form the catalyst. Fines resulting from the grinding step are completely recycled to the intensive mixing stage of the process to achieve 100% yield. Some adjustment of acid content of the mix may be needed to take into account the acid carried into the mix by recycled fines.

The acid-activated bentonite-based clay catalyst of the present invention is primarily useful for treating extraction unit extract streams for recovery of aromatic hydrocarbons free from reactive olefins. The clay-based catalyst is characterized by its mildly acidic catalytic activity and at temperatures of between about 150° and about 200° C. (about 300° to about 400° F.), the acid sites on the clay promote polymerization and alkylation of olefins. While olefins react (polymerize) in contact with the clay catalyst in either the liquid or vapor phase, treatment (catalytic polymerization of olefins) is preferably carried out in the liquid phase in a pressurized reaction vessel because all but the heaviest polymerization products are soluble in the reformate extract liquid fed to the reaction vessel and are removed from the reactive sites, leaving the reactive sites free for further activity. Liquid phase operation is maintained by controlling the pressure in the reaction vessel high enough to prevent vaporization of the hydrocarbons while in contact with a bed of the clay catalyst.

The catalyst is also useful in other processes, such as in decolorizing oils, e.g., mineral oils, by adsorption of the color bodies. In this application, the clay life is short, but the absorbed materials can be removed from spent catalyst by steaming, thereby restoring the adsorptive capacity of the clay granules.

The acidic properties of the acid-activated bentonite clay-based catalyst of the present invention also promote other typically acid-catalyzed reactions, such as in crude oil cracking, transalkylation and isomerization. In treating the reformate extract product for olefin separation, these reactions are of little consequence except at the end of the clay life cycle when the temperature is high enough to promote cracking. Generally, no adverse influence of the clay on extract quality is observed except when traces of thiophenes and mercaptans are present. These components, even in a few ppm quantities, are broken down by the clay, thereby forming $H_2S$ that concentrates in the benzene fraction of the product. If thiophenes or mercaptans are present in the extractor feed, treating the benzene fraction of the product over solid caustic, as known in the art, may be required.

DETAILED DESCRIPTION OF THE PREFERRED EMBODIMENT

The bentonite clay-based clay granules of the present invention are manufactured from acid-activated bentonite clay fines, predominantly having a particle size falling through a 60 mesh screen, U.S. Sieve Series. The acid-activated clay fines are intensively mixed with a strong mineral acid, such as $H_2SO_4$, and water to form clay fine acid bound aggregates that, after curing and drying, then are ground to a preferred particle size distribution of about −6 to about +60 mesh, U.S. Sieve Series, for uses such as catalyzing polymerization of olefins, removing color from color-contaminated oils, and other uses known in the art for acid-activated bentonite clays.

In the early 1900s, it was discovered that the bleaching power of clays such as bentonite could be enhanced far better than the bleaching power of the best crude clays in use at the time provided that the clay was first treated with a mineral acid, such as hydrochloric or sulfuric acid, and washed substantially free of dissolved salts and residual acid. The general process of acid-activation of clays, as used today in industry, includes grinding the clay for uniform activation and dispersion in water; slurrying the ground clay in water and then adding acid to the clay slurry in an attempt to achieve a substantially uniformly activated clay. Usually about 6 to 8 hours of acid digestion is necessary to properly acid-activate the clay. The digested slurry then is washed substantially free of dissolved salts, such as iron and aluminum sulfates or chlorides, depending upon the particular mineral acid used. The acid-activated clay then is dewatered, such as by filtration, and the resulting filter cake is dried and subsequently ground to product specifications.

The following patents describe various processes for treatment of clay to enhance the filtering characteristics of the clay in the removal of colorizing compounds: U.S. Pat. Nos. 1,402,112; 1,408,644; 1,408,656; 1,524,843; 1,544,210; 1,731,702; 1,739,734; 4,717,699; 4,847,266; and 4,919,818. Each of these processes for acid treating clay is useful in accordance with the principles of the present invention.

The process of the present invention is useful with any of the clays known to be used in bleaching or decolorizing by filtration, such as any of the bentonites, including swelling bentonites such as sodium bentonites or the non-swelling bentonites such as calcium magnesium bentonite. The process is also useful for clays dominated by high contents of smectite type clay minerals, such as any of the montmorillonites, nontronite and saponite, illite and hydrous-mica types of clay minerals, halloysite, and slaking-type bentonites. The process does not appear to be useful on kaolinite dominated clay deposits.

In accordance with a preferred embodiment of the present invention, the raw material is derived from the so-called sub-bentonite or slaking-type bentonites which contain high levels of smectite clay, such as montmorillonite, nontronite, saponite or beidellite clay minerals wherein the predominant base exchange ions are calcium and/or magnesium ions and/or hydrogen ions.

Sodium bentonite, having sodium as a predominant exchangeable cation, is composed of layers, sheets or platelets (crystals) with the exchangeable cation occurring between the layers. The layers (crystals) are randomly oriented in crude clay particles. It is preferred to add a minor amount, e.g., about 1% to about 10%, preferably about 5% by total weight of the mix in the intensive mixer, sodium bentonite (not acid-activated) to the product for added binding of the granules.

As known in the art, the acid, determined on a 100% acid basis, should be included in the activation solution in an amount of about 10% to about 35% by weight acid and, the acid concentration may vary depending on the acid in solution to achieve best results. Hydrochloric and nitric acids, when used as the acid for the acid-activation solution, should be present in the solution in an initial concentration in the range of about 10% to about 25% by weight acid and usually in the range of about 12% to about 20% by weight acid. Best results with hydrochloric or nitric acids are achieved at an acid concentration of about 15% by weight. It has been found that when sulfuric acid is used as the acid in the acid-activation solution, the concentration of sulfuric acid should be in the range of about 10% to about 35% by weight sulfuric acid, and generally at a sulfuric acid concentration in the range of about 15% to about 25% by weight. To achieve the full advantage of the present invention when sulfuric acid is used in the acid-activating solution, the sulfuric acid should be included at a concentration of about 18% to about 22% by weight sulfuric acid, with best results being achieved at a sulfuric acid concentration of about 20% by weight.

In accordance with a preferred embodiment of the present invention, clay pellets or appropriately ground clay particles, are gradually added to an agitated solution of acid, at an initial temperature of about 25° C. to 75° C., and thereafter heated to 80° C. to 100° C. for complete acid-activation. The acid solution preferably has an acid concentration of about 10% to about 35% by weight to achieve relatively fast diffusion of the acid into the pores of the clay particles. It is understood that any method of acid-activation of clay is sufficient to acid-activate the clay. The particular acid in the acid solution is not critical and may be sulfuric, hydrochloric, nitric, phosphoric, or any other acid used in the art of acid-activating smectite clays. Sulfuric acid is preferred.

The initial temperature of the acid-activation solution is largely determined by the heat of dilution of the acid, but is generally in the range of about 25° C. to 75° C. More specifically, for sulfuric acid, the initial temperature of the acid-activating solution should be in the range of about 50° C. to about 65° C. and for hydrochloric and nitric acids the initial temperature of the acid-activation bath should be in the range of about 30° C. to about 45° C. to achieve good diffusion of the acid into the interstices of the clay particles without breakdown or disintegration of the particles. The conditions for the initial contact of the ground clay particles in the acid-activating bath should not create steam since the hydration of the clay particles and steam production within the interstices of the clay particles may cause breakdown and disintegration of the clay particles, thereby producing a substantial portion of particles having a ultra fine particle size less than about 5 microns, causing excessive acid-activation of the ultra fines, and slower filtration and washing.

When acid-activation has been completed, the acid treating clay is separated from a majority of the acid solution and then washed. Both steps of separating the acid treated clay from the acid solution and the washing of the acid treated clay can be achieved in a filter press. In accordance with a preferred embodiment, the slurry of acid-activated clay in the acid-activation solution is pumped, while hot, to a chamber-type filter press having open drainage to extract the acid solution or mother liquor while filling the filter press chambers with the acid-activated clay. The flow rate of the acid solution decreases when the chambers of the filter press are filled as a signal to stop the flow of acid-activated clay into a filter press and to begin introducing wash water through the filter press. Generally, the filter press chambers are washed with wash water introduced at a pressure of about 20 to 150 pounds per square inch maintained until washing is complete. Washing the acid-activated clay removes excess acid, dissolved iron, aluminum, magnesium, and calcium ions and other clay contaminants. The end of the washing step may be determined by monitoring the filtrate from each filter chamber, such as for pH, residual chlorides, and the like, to determine when substantially clean water is being removed as a filtrate. Generally, washing is complete when the filtrate has a pH of about 2.5 to about 4 and, to achieve the full advantage of the present invention, the pH of the filtrate water should be in the range of about 3 to 3.5 as an indication that washing of the acid-activated clay is complete.

After acid-activation, the clay is again treated with acid and water and intensively mixed and aggregated into clumps in an intensive mixer, for example, in an Eirich Intensive Mixer, Eirich Machine, Inc., New York, N.Y., Model DE 29, that includes a wall-scraping mounting arm and high energy rotor. An excellent particle size distribution for the particles fed to the granulator (Eirich Mill Intensive Mixer) is shown in the drawing. As shown, the clay particle feed is in the range of about 2 microns to about 200 microns, with most of the particle in the range of about 48 microns to about 100 microns, with greater than 65% by weight in the range of about 50 microns to about 130 microns.

The preferred clay charged to the Eirich Intensive Mixer is VICI clay, obtained from American Colloid Company, which is basically a calcium montmorillonite clay meeting desiccant specifications and having the following characteristics and specifications: $SiO_2$: 50.9%; $Al_2O_3$: 15.4%; CaO: 3.82%; MgO: 2.86%; $Na_2O$: 0.20%; $K_2O$: 0.76%; $Fe_2O_3$: 4.67%; MnO: 0.06%; $TiO_2$: 0.73%; $P_2O_5$: 0.09%. VICI clay has 79 meq. (milliequivalents) $Ca^{++}$ per 100 grams, 17 meq. $Mg^{++}$ per 100 grams (American Colloid Test Method 1004); and 134 meq. per 100 grams methylene blue dye adsorption (American Colloid Test Method 1016). VICI clay also meets the criteria set forth in Military Specification D-3463D, which requires at least 18.75% water vapor adsorption in equilibrium with acid at 40% relative humidity at 25° C. Typically, VICI clay is capable of adsorbing 19% to 20% water under said Military Specification conditions. Preferably, the acid-activated VICI clay is added to the mixer at an average particle size in the range of about 10 to about 100 microns, more preferably about 50 microns average particle diameter, by screening the acid-activated clay, after drying to a water content of about 5% to about 15% moisture; preferably about 10.5% moisture ±1%, dry clay basis.

The clay is charged to an intensive mixer together with about 40% to about 70% by weight water and about 1% to about 5% active sulfuric acid, and the remainder (dry basis, to 100%), or acid-activated clay content, is in the range of about 25% to about 40% by weight acid-activated clay in the intensive mixer. To achieve the full advantage of the present invention, the mixer should be charged with about 55% to about 60% water; 2% to 4% sulfuric acid and about 30% to about 43% by weight acid-activated clay (dry weight basis). Sodium bentonite (not acid-activated) optionally can be included in an amount of about 1% to about 10%, preferably about 5% based on the total weight of feed to the intensive mixer for additional binding of the aggregates formed from clay fines in the intensive mixer. The mixer is operated for about 25 to about 35 minutes and the resulting material is cured, e.g., in a concrete bunker, at ambient temperature, for at least about 12 hours, preferably at least about 24 hours, prior to drying to a preferred moisture content of about 2% to about 3% by weight (dry weight basis) before being bagged in a moisture impermeable container.

EXAMPLE

VICI clay is dried to 10.5% moisture ±1% by weight (dry clay basis), screened for oversize particles and foreign material. The clay then is transferred to an acid plant for acid-activation. The reactor is charged with 15,725 pounds of VICI clay, 2,586 gallons of water and 446 gallons of sulfuric acid (98% active). The mixture is agitated and reacted at a temperature of 220° F. for 10 hours, then pumped through a filter press and washed to a pH of filtrate of 3.5, then milled and dried to a 13.5% ±1.5% moisture by weight (dry basis) and a median average particle size of 50 microns. The ground, acid-activated clay is sent to a high intensity mixer (Eirich Model DE 29). In the intensive mixer approximately 3,000 pounds of acid-activated VICI clay is mixed with 57% by weight water, 3% by weight sulfuric acid (98% active) and about 5% by weight sodium bentonite. This composition is mixed for 25 to 35 minutes to form bound granules, then air dried in concrete bunkers for at least about 12 hours, preferably about 24 hours. After air drying, the granules are dried in a kiln dryer, at a rate of 700 pounds per hour, and dried to a preferred moisture content of about 2% to about 3% by weight (dry basis), then screened to a 6–60 mesh particle size distribution.

It is theorized that in reprocessing the acid-activated clay with a strong mineral acid, e.g., $H_2SO_4$, in the high intensity mixer, the $H^+$ ions form a bond between the clay platelets that holds the clay together sufficiently in granules to act as a catalyst in a reaction vessel. Aging (curing at ambient temperature for at least about 12 hours) appears to complete the bonding process whereby the material can be dried and ground to the proper sizing with fines recycled to the high intensity mixer.

In a preferred use, after grinding the clay to a suitable particle size distribution (e.g., +6, −60 mesh, U.S. Sieve Series) the resulting granules are used to catalyze the polymerization of olefins, e.g., for recovery of pure aromatic hydrocarbons by contact with a bed of these granules in a reaction tower.

One important variable is using the granules to catalyze olefin polymerization is the inlet temperature of the hydrocarbon feed to the catalyst-containing vessel. The adsorption capacity of the clay, manufactured in accordance with the present invention, decreases as temperature is increased. The catalytic activity, however, increases with increasing temperature. Increasing the temperature, therefore, increases the clay life for a given quality of feed to the catalyst vessel (reactor).

On the other hand, higher temperatures are a disadvantage, because higher pressures must be employed to keep the extract (catalyst vessel feed) in the liquid state. In addition, excessively high temperatures result in possible yield losses due to side reactions. It has, therefore, been found preferable to limit the treating temperature to a range of about 150° C. to about 200° C. (about 300° F. to about 400° F.). Below about 150° C. (about 300° F.), the adsorption capacity is high and the catalytic activity is so low that short clay lives are experienced.

Several factors influence clay life. These are:
a. The quantity of olefins and diolefins in the clay (catalyst) tower feed;
b. The degree of olefin removal required;
c. The temperature at which the clay (catalyst) bed is operated;
d. Type of clay employed to manufacture the catalyst;
e. The presence of poisons in the clay (catalyst) tower feed; and
f. Operation of two clay (catalyst) towers in series.

Clay life varies according to the quantity of olefins in the clay tower feed (the degree of olefin removal required). The higher temperature required for more severe conversion increases the rate of formation of insoluble, high molecular weight polymers and coke on the clay. These deposits reduce the clay activity by blocking access to the active clay sites. Generally, extracts produced from hydrogenated steam-cracked naphthas contain only 20% as many olefins as extracts which originated from catalytic reformate. As a result, the clay life for processing hydrogenated steam-cracked naphthas is five times as long as for processing catalytic reformate.

The clay granules of the present invention have sufficient activity at lower temperatures, e.g., 275° F.+, so that the feed temperature can be maintained lower, at the beginning of BTX separation for increased clay life.

The quality of clays has greatly improved over the years, a factor greatly contributing to the possibility of reducing the size of a clay bed to obtain an equivalent cycle length. Typically an acid-activated clay such as Filtrol-24 (Engelhard Corporation), achieves a life cycle five times greater than a natural Attapulgite clay. Filtrol-24 acid-activated clay used to process an extract which was produced from catalytic reformate will typically achieve a life of 15,000 to 20,000 tons per ton of acid-activated clay. This life is as high as 100,000 to 130,000 tons per ton of acid-activated clay when processing extract from a hydrogenated steam-cracked naphtha. The properties of Filtrol-24 acid-activated clay are shown in Table III.

TABLE III

PROPERTIES OF FILTROL GRADE 24 CLAY
20-30 MESH ACID-ACTIVATED CLAY

| | |
|---|---|
| USES: | Replaces raw clay and bauxite in the purification of non-aqueous liquids by percolation. Has high decolorizing efficiency for refractory stocks. Particularly suitable for removal of contaminants from aromatics. The economics are most favorable in percolation systems when regeneration equipment is not included. Promotes condensation, polymerization and desulfurization reactions. |
| Particle Size Distribution by Tyler Standard Screen: | |
| Through 20 mesh, Wt.-% | 100 |
| Through 60 mesh, Wt.-% | 5 |
| Free moisture, Wt.-%: | 10 |
| Free and combined moisture, Wt.-%: | 15 maximum @ 1700° F. |
| Bulk density, lb/cu. ft.: | 47.0 |
| Particle density, grams/cc: | 1.3 |
| Surface area by BET method, $m^2$/gram: | 280-300 |
| Data furnished by: | Filtrol Corporation 5959 West Century Boulevard Los Angeles, California 90045 |

In the early days of SULFOLANE extraction, it was believed that solvent would strongly adsorb on the clay and, therefore, deactivate it prematurely. It was, however, found that small concentrations of solvent in the extract, up to 200 ppm, did not influence the clay and were not adsorbed. At higher SULFOLANE concentrations (over 500 ppm) some adsorption on the clay occurred and after long periods of exposure, clay activity was lost. A much higher concentration of solvent was found to be tolerable for short periods of time. In both pilot plant and commercial operations it was found that extract containing up to one percent solvent did not cause permanent loss of clay activity. Clay activity recovered after a short period of operation on clean extract.

What is claimed is:

1. A process for manufacturing granules comprising an acid-activated smectite clay comprising:
    contacting particles of a smectite clay with an acid, and washing excess acid from the smectite clay particles, to form acid-activated smectite clay particles;
    binding said acid-activated clay particles together by mixing a composition containing said acid-activated smectite clay particles, water in an amount of about 40% to about 70% by weight, and an acid, to form bound granules of said smaller, acid-activated clay particles;
    recovering granules having a desired particle size distribution; and
    recycling non-recovered granules to the binding stage of the process for recovery of aggregates having the desired particle size distribution.

2. A process, as defined in claim 1, wherein the acid-activated smectite clay particles are formed by slurrying smectite clay particles in water with a mineral acid at a concentration of abut 10% to about 35% by weight acid, said acid selected from the group consisting of sulfuric acid, hydrochloric acid, nitric acid, phosphoric acid, and mixtures thereof.

3. A process as defined in claim 1, wherein the concentration of acid in the composition of the binding stage is in the range of about 1% by weight to about 10% by weight acid, based on the total weight of clay, water and acid in the composition.

4. A process as defined in claim 3, wherein the concentration of acid in the composition of the binding stage is in the range of about 1% by weight to about 5% by weight acid, based on the total weight of clay, water and acid in the composition.

5. A process as defined in claim 3, wherein the smectite clay is acid-activated with sulfuric acid, and sulfuric acid is mixed with the acid-activated particles and water in said binding stage composition to form said bound granules.

6. A process as defined in claim 1 further including the step of grinding said recovered granules prior to recycling said non-recovered granules to achieve an essentially 100% yield.

7. A process as defined in claim 1, wherein the acid-activated smectite clay is calcium montmorillonite.

8. A process as defined in claim 7 including the step of adding about 1% to about 10% by weight sodium montmorillonite, based on the total weight of clay, water and acid in the composition of the binding step of the process for additional granule strength.

9. A process as defined in claim 1, wherein the particle size of the acid-activated smectite clay in the composition of the binding stage of the process is in the range of about 10 microns to about 100 microns, and the particle size of the granules formed in the binding stage is predominantly larger than 100 microns.

10. A process as defined in claim 9, wherein granules are recovered from the binding stage having a particle size larger than about 60 mesh, U.S. Sieve Series, and smaller than about 6 mesh, U.S. Sieve Series.

11. A process as defined in claim 10, wherein the recovered granules larger than 6 mesh, U.S. Sieve Series, are ground to a particle size less than about 100 microns and said ground particles having a particle size less than about 100 microns, together with said particles smaller than 60 mesh, U.S. Sieve Series, are recycled back to the binding step of the process.

12. A process, as defined in claim 1 further including the step of curing the granules for a period of at least about 12 hours at a water content of at least 5% by weight prior to drying the granules.

13. A process as defined in claim 12, wherein the granules are heated, after curing, to dry the granules to a water content less than 5% by weight water.

14. A process as defined in claim 1, wherein the clay, water and acid in the binding stage composition is mixed for a period of about 15 minutes to about 1 hour.

15. A process as defined in claim 14, wherein the clay, water and acid in the binding stage composition is mixed for a period of about 25 minutes to about 35 minutes.

16. A process for manufacturing granules comprising an acid-activated smectite clay comprising:
   binding acid-activated smectite clay particles having a particle size below about 200 microns, by mixing a composition containing said acid-activated smectite clay particles, water in an amount of about 40% to about 70% by weight of the composition, and an acid, to form bound aggregates of said acid-activated clay particles;
   recovering aggregated granules, from said binding stage, having a desired particle size distribution; and
   recycling non-recovered granules to the binding stage of the process for recovery of aggregates having the desired particle size distribution.

17. A process as defined in claim 16, wherein the concentration of acid in the clay-acid-water binding stage composition is in the range of about 1% by weight to about 10% by weight acid, based on the total weight of clay, water and acid.

18. A process as defined in claim 17, wherein the concentration of acid in the clay-acid-water binding stage composition is in the range of about 1% by weight to about 5% by weight acid, based on the total weight of clay, water and acid.

19. A process as defined in claim 17, wherein the smectite clay has been acid-activated with sulfuric acid, and sulfuric acid is mixed with the acid-activated particles and water in the binding stage composition to form said bound aggregated granules.

20. A process as defined in claim 16 further including the step of grinding oversized granules recovered from the binding stage of the process prior to recycling non-recovered granules to the binding stage of the process to achieve an essentially 100% yield.

21. A process as defined in claim 16, wherein the acid-activated smectite clay is calcium montmorillonite.

22. A process as defined in claim 21 including the step of adding about 1% to about 10% by weight sodium montmorillonite, based on the total weight of clay, water and acid to the binding stage composition for additional granule strength.

23. A process as defined in claim 11, wherein the particle size of the acid-activated smectite clay in the binding stage composition is in the range of about 2 microns to about 200 microns, predominantly in the range of about 48 microns to about 96 microns, and the particle size of the granules formed in the binding stage is predominantly larger than 100 microns.

24. A process as defined in claim 23, wherein granules are recovered from the binding stage of the process having a particle size larger than about 60 mesh, U.S. Sieve Series, and smaller than about 6 mesh, U.S. Sieve Series.

25. A process as defined in claim 24, wherein the granules recovered from the binding stage of the process that are larger than 6 mesh, U.S. Sieve Series, are ground to a particle size less than about 200 microns and said ground particles having a size less than about 200 microns, together with said particles smaller than 60 mesh, U.S. Sieve Series, are recycled back to the binding step of the process.

26. A process, as defined in claim 16, further including the step of curing the granules recovered form the binding stage of the process for a period of at least about 12 hours at a water content of at least 5% by weight prior to drying the granules.

27. A process as defined in claim 26, wherein the granules are heated, after curing, to dry the granules to a water content less than about 5% by weight water.

28. The product made by the process of claim 1.

* * * * *